US012663764B2

(12) United States Patent
Kawaharazuka et al.

(10) Patent No.: US 12,663,764 B2
(45) Date of Patent: Jun. 23, 2026

(54) INFERENCE APPARATUS, TRAINING APPARATUS, AND INFERENCE METHOD

(71) Applicant: Preferred Networks, Inc., Tokyo-to (JP)

(72) Inventors: Kento Kawaharazuka, Tokyo-to (JP); Toru Ogawa, Tokyo-to (JP)

(73) Assignee: Preferred Networks, Inc., Tokyo-to (JP)

( * ) Notice: Subject to any disclaimer, the term of this patent is extended or adjusted under 35 U.S.C. 154(b) by 1158 days.

(21) Appl. No.: 17/109,870

(22) Filed: Dec. 2, 2020

(65) Prior Publication Data

US 2021/0165374 A1     Jun. 3, 2021

(30) Foreign Application Priority Data

Dec. 3, 2019    (JP) ................................. 2019-219013

(51) Int. Cl.
| | |
|---|---|
| *G06N 20/00* | (2019.01) |
| *G05B 13/02* | (2006.01) |
| *G06N 3/044* | (2023.01) |
| *G06N 3/08* | (2023.01) |

(52) U.S. Cl.
CPC ........... G05B 13/027 (2013.01); G06N 3/044 (2023.01); G06N 3/08 (2013.01)

(58) Field of Classification Search
CPC ........ G05B 13/027; G06N 3/044; G06N 3/08; G06N 3/045; G06N 3/084; G06N 3/0442; G06N 3/0464; G06N 3/09
See application file for complete search history.

(56) References Cited

U.S. PATENT DOCUMENTS

| | | | | |
|---|---|---|---|---|
| 11,254,002 B1* | 2/2022 | Ebrahimi Afrouzi | .. | G06N 3/044 |
| 2007/0239641 A1* | 10/2007 | Ito | .......................... | G06N 3/008 |
| | | | | 706/903 |
| 2017/0154413 A1* | 6/2017 | Yu | ...................... | G06F 18/23213 |
| 2018/0218262 A1* | 8/2018 | Okada | ..................... | G06N 3/084 |
| 2019/0005374 A1* | 1/2019 | Shankar | ................. | G06N 3/084 |
| 2019/0018398 A1* | 1/2019 | Nakagawa | ....... | G05B 19/41885 |
| 2019/0361409 A1* | 11/2019 | Bettinger | ........... | G05B 13/0265 |
| 2020/0201313 A1* | 6/2020 | Kludt | ........................ | G06N 5/04 |

(Continued)

FOREIGN PATENT DOCUMENTS

| | | |
|---|---|---|
| JP | 2020-095471 A | 6/2020 |
| JP | 2020-140641 A | 9/2020 |

OTHER PUBLICATIONS

Chiang, Leo, Bo Lu, and Ivan Castillo. "Big data analytics in chemical engineering." Annual review of chemical and biomolecular engineering 8.1 (2017): 63-85 (Year: 2017).*

(Continued)

*Primary Examiner* — Andrew T Mcintosh
(74) *Attorney, Agent, or Firm* — Foley & Lardner LLP

(57)     ABSTRACT

An inference apparatus includes one or more memories; and one or more processors. The one or more processors configured to acquire a latent state from input data regarding a control target; acquire a future latent state from the latent state and control data; infer, from the future latent state, a time series of a task to be executed by the control target to be controlled based on the control data; calculate a loss between the time series of the task and data indicating a target state; and update the control data based on the loss.

5 Claims, 12 Drawing Sheets

(56) References Cited

U.S. PATENT DOCUMENTS

| | | | |
|---|---|---|---|
| 2020/0379442 A1* | 12/2020 | Chan | B01J 19/0033 |
| 2021/0109687 A1* | 4/2021 | Harai | G06F 3/1287 |
| 2021/0302926 A1 | 9/2021 | Kawaharazuka et al. | |
| 2021/0387343 A1 | 12/2021 | Imajo et al. | |
| 2022/0274255 A1* | 9/2022 | Okawa | B25J 9/1612 |

OTHER PUBLICATIONS

Chang Tai Kiang, et.al., "Review of Control and Sensor System of Flexible Manipulator," Journal of Intelligent & Robotic Systems, vol. 77, No. 1, pp. 187-213, 2015.

Wayne J. Book, "Recursive Lagrangian Dynamics of Flexible Manipulator Arms," The International Journal of Robotics Research, vol. 3, No. 3, pp. 87-101, 1984.

Paul T Kotnik, et.al., "Acceleration feedback for control of a flexible manipulator arm," Journal of Robotic Systems, pp. 322-323, 1988.

V. G. Moudgal, et.al., "Fuzzy learning control for a flexible-link robot," IEEE Transactions on Fuzzy Systems, vol. 3, No. 2, pp. 199-210, 1995.

S. K. Pradhan, et.al., "Real-Time Adaptive Control of a Flexible Manipulator Using Reinforcement Learning," IEEE Transactions on Automation Science and Engineering, vol. 9, No. 2, pp. 237-249, 2012.

Zhihong Su, et.al., "A neural-network-based controller for a single-link flexible manipulator using the inverse dynamics approach," IEEE Transactions on Industrial Electronics, vol. 48, No. 6, pp. 1074-1086, 2001.

C. Sun, et.al., "Neural Network Control of a Flexible Robotic Manipulator Using the Lumped Spring-Mass Model," IEEE Transactions on Systems, Man, and Cybernetics: Systems, vol. 47, No. 8, pp. 1863-1874, 2017.

M. Inaba, et.al., "Rope handling by a robot with visual feedback," Advanced Robotics, vol. 2, No. 1, pp. 39-54, 1987.

Y. Yamakawa, et.al., "Motion planning for dynamic folding of a cloth with two high-speed robot hands and two high-speed sliders," ICRA2011, pp. 5486-5491, 2011.

Y. Yamakawa, et.al., "Motion planning for dynamic knotting of a flexible rope with a high-speed robot arm," IROS2010, pp. 49-54, 2010.

D. Tanaka, et.al., "EMD Net: An Encode-Manipulate-Decode Network for Cloth Manipulation," RAL, vol. 3, No. 3, pp. 1771-1778, 2018.

Kento Kawaharazuka, et.al., "Dynamic Manipulation of Flexible Objects with Torque Sequence Using a Deep Neural Network," ICRA2019, 2019.

P. Yang, et.al., "Repeatable Folding Task by Humanoid Robot Worker Using Deep Learning," RAL, vol. 2, No. 2, pp. 397-403, 2017.

A. X. Lee, et.al., "Learning force-based manipulation of deformable objects from multiple demonstrations," ICRA2015, pp. 177-184, 2015.

Yuheng Wu, et.al., "Dynamic Motion Generation by Flexible-Joint Robot based on Deep Learning using Images," EPIROB2018, 2018.

K. Kawaharazuka, et.al., "Dynamic Manipulation of Flexible Objects with Torque Sequence Using a Deep Neural Network," arXiv:1901.10142 (2019), https://arxiv.org/abs/1901.10142.

Kento Kawaharazuka et.al., "Dynamic Task Control Method of a Flexible Manipulator Using a Deep Recurrent Neural Network", IROS 2019 Conference, Nov. 7, 2019.

* cited by examiner

START

S300 — RECEIVE STATE

S302 — SET CONTROL INPUT

S304 — PERFORM FORWARD PROPAGATION

S306 — CALCULATE ERROR

S308 — UPDATE PARAMETER

S310 — OUTPUT PARAMETER

END

INFERENCE APPARATUS, TRAINING APPARATUS, AND INFERENCE METHOD

CROSS REFERENCE TO RELATED APPLICATIONS

This application claims the benefit of and priority to Japanese Patent Application No. 2019-219013, filed on Dec. 3, 2019, the entire contents of which are incorporated herein by reference.

FIELD

The embodiments described herein relate to an inference apparatus, a training apparatus, and an inference method.

BACKGROUND

Controlling a flexible body is technically challenging and has been a subject of much research. However, in the case of an arm connected to the flexible body, a focus is on controlling a position of a tip of this arm, and not on dynamically enabling a predetermined task. Besides, most flexible bodies are modeled to some extent and their parameters are explored by learning. This makes conventional research difficult to apply, for example, when an arm or the like that is configured by materials such as octopus legs is used.

DETAILED DESCRIPTION OF THE INVENTION

According to some embodiments an inference apparatus includes one or more memories; and one or more processors. The one or more processors configured to acquire a latent state from input data regarding a control target; acquire a future latent state from the latent state and control data; infer, from the future latent state, a time series of a task to be executed by the control target to be controlled based on the control data; calculate a loss between the time series of the task and data indicating a target state; and update the control data based on the loss.

Embodiments of the present invention will now be explained with reference to the accompanying drawings. The explanations of the drawings and the embodiments are made as examples but not intended to limit the present invention.

Figure 1:
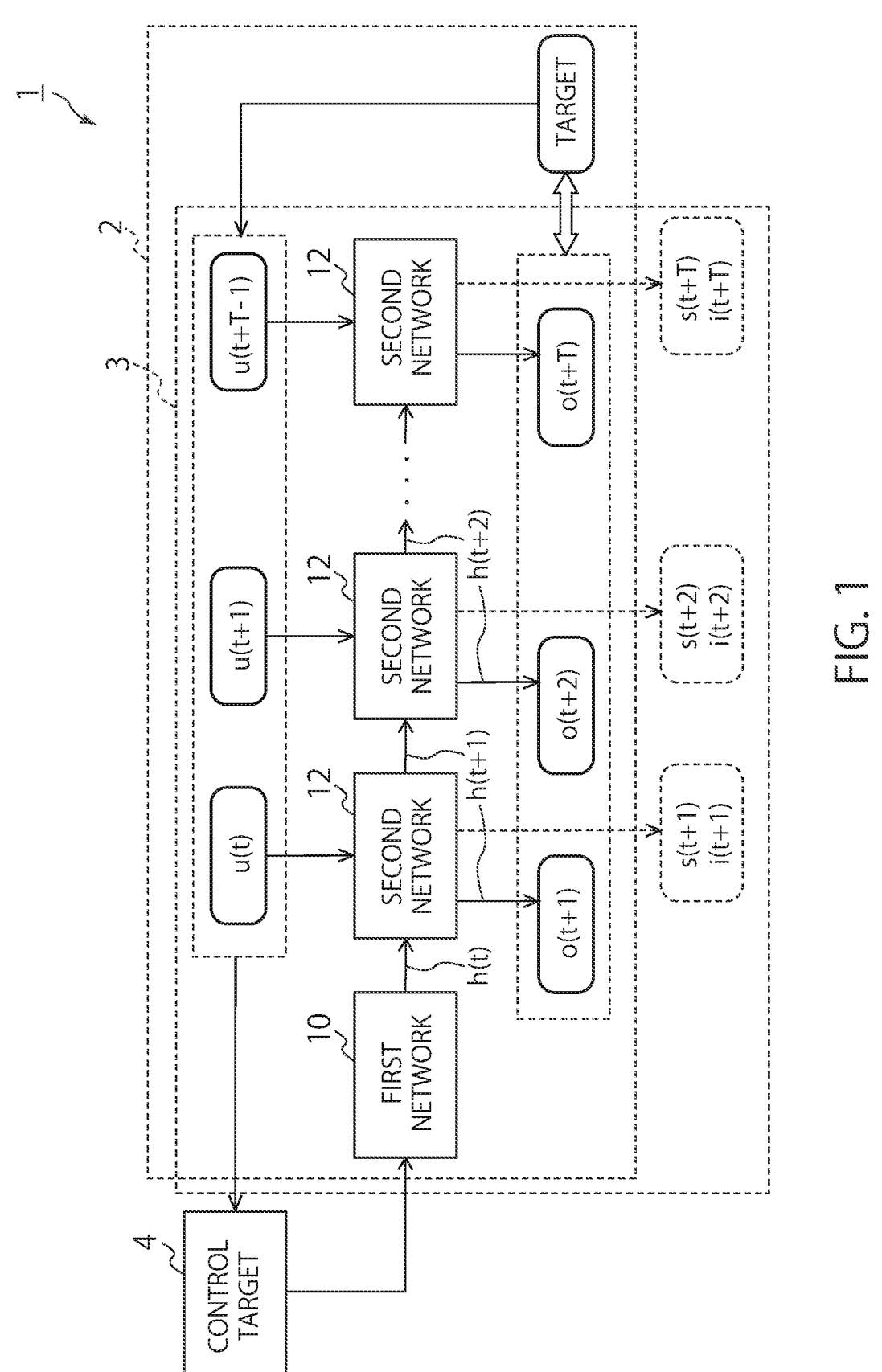
FIG. 1 is a diagram illustrating an example of a system according to one embodiment.

FIG. 1 is a schematic diagram of an information processing system, including inference and training, according to one embodiment. First, the overall operation of an inference apparatus 2 and a training apparatus 3 will be described.

An information processing system 1 in one embodiment is provided with the inference apparatus 2 and the training apparatus 3. The information processing system 1 is provided with at least a first network 10 and a second network 12, outputs data to control a control target 4, or trains control data to control the control target 4. Further, a third network 14, a fourth network 16, and a fifth network 18, which will be described below, may be provided. The control target 4 is, for example, a robot or the like having a flexible body. However, the control target 4 is not limited to this and may be other system like a process system such as an industrial plant. The information processing system 1 in the embodiment outputs data to control the control target having such a flexible body, or trains to infer this control data.

The inference apparatus 2 outputs data to control the control target 4 based on a state output from the control target 4 at a certain time. Thus, the inference apparatus 2 functions as the control system for controlling the control target 4. The first network 10 acquires the data regarding the state output from the control target as an initial state. The data regarding the state is, for example, an image taken of the control target 4 or information regarding joints of the control target 4, such as torque, angle, and velocity.

The first network 10 is a neural network that converts the data regarding the state acquired as the initial state into a latent state that is a feature (e.g. feature vector) in a latent space. The first network 10 is a neural network having, for example, a fully connected layer, and may further have a convolution layer in addition to the fully connected layer. The first network 10 is configured such that, for example, a dimension of output data is smaller than a dimension of input data, and the feature of the input data can be acquired.

The first network may take an appropriate structure depending on nature of the data to be input. For example, when numerical values (vectors, tensors) indicating the states of the control target 4, such as torque, angle, and velocity, are input, the first network 10 may be provided with the fully connected layer. For example, when data regarding the image of the control target 4, more concretely, data such as an optical flow are input, the first network 10 may be provided with the convolution layer. Furthermore, when both of these data are input, the first network 10 may be a neural network combining, for example, the convolution layer where the optical flow is input and the fully connected layer, which is connected to the convolution layer, and where the above-mentioned quantities such as vectors, tensors, are input. The above configuration is an example. For example, the first network may be configured only by the convolution layer without the fully connected layer, even if numerical values indicating the states of the control target 4 are input.

The inference apparatus 2 inputs the latent state acquired by the first network 10 into the second network 12. When this latent state and the control data are input, the second network 12 outputs a state of a task based on behavior of the control target 4. The task may be a deliverable produced by the control target 4 controlled based on the control data. The second network 12 is, for example, an RNN (recurrent neural network). More concretely, the second network 12 may be, for example, an LSTM (long short term memory) or another RNN.

The second network 12 is not limited thereto and may be formed without the use of the RNN. For example, the second network 12 may be provided with multiple networks outputting time series of inference at different times or may be configured to output the time-series data in a single network. In the following, an example of using the RNN will be mainly described, but in the absence of any additional explanation, embodiments in the present disclosure may be applied in the same way to other network configurations as well.

The control data input to the second network 12 is, for example, a control data inferred at the time before time tin focus and output to the control target 4. As described above, since the second network is, for example, the RNN, input and output are performed from the time t to time after predetermined time T has passed at each unit time. When the unit time is set to 1, the input data are, for example, time-series data of u(t), u(t+1), . . . , u(t+T−1), which are the control data from the time t to the predetermined time t+T−1. The time-series data are sequentially input to the second network 12.

The second network 12 also receives the latent state, which is input at each time, and updates this latent state based on the control data to make it the input of its own. In this way, the second network 12 outputs the latent state at the next time based on its output (or, regarding the time t, the output of the first network 10) and a control data Input that is input. For example, a latent state at the current t' and a control data u(t') at time t' are input, and the latent state at the next time t'+1 is output, but this is not limited thereto. For example, a latent state at time t'−1, which is a unit time earlier and the control data u(t') at the time t' may be input, and the latent state at the time t' may be output.

The second network 12 may not be the RNN, as described above. That is, the second network 12 may be a network that outputs states of the task in time series or other information when the latent state or control data at the time t that is focused is input. As another example, the second network 12 may be a network that outputs a subsequence of a future time series when a subsequence of the time series is input. For example, the second network 12 may be configured as a network other than the RNN that inputs data at times (t, t+1, t+2) and outputs data at times (t+1, t+2, t+3) by inferring the data or outputs data at times (t+3, t+4, t+5) by inferring the data.

In this case, the second network 12 may not, for example, output a future latent state. That is, the second network 12 may, for example, directly output at least one of a state of a task o to be executed, a state s, an image i, or a control data u without outputting a latent state h.

Thus, the second network 12 may be any model that is capable of properly outputting data that is input to subsequent networks or the like, for data that can be input. In the case of a network capable of outputting time-series data by inputting data acquired through the first network 10, there is no need to distinguish between the first network 10 and the second network 12, and these networks may be configured as one network.

Although it is assumed that the data at the next time t+1 is output for the time t, it is not limited thereto, and any network is acceptable as long as the future state is output. The same is true for the following explanations.

In the inference apparatus 2, the second network 12 further outputs a prediction of a state of a task to be executed by the control target 4 based on a latent state h( ) from the previous time and a control data u( ) at the corresponding time. For example, the second network 12 outputs h(t+1), h(t+2), . . . , h(t+T−1), indicating the latent states of the control target 4 at each time based on the control data u( ) from the time t to t+T−1, which is after a predetermined time has passed.

The output of the second network 12 is output as a task, for example, by the third network 14, which is not illustrated in FIG. 1, which infers how task will be executed when the control target 4 is controlled by the control input u( ). The third network 14 outputs tasks o(t+1), o(t+2), . . . , o(t+T) to be executed when, for example, h(t+1), h(t+2), . . . , h(t+T) are input.

The inference apparatus 2 may be provided with, for example, the third network 14 that is separate from the second network 12. As described above, in this case, the third network 14 is input with the states h(t+1), . . . , h(t+T) output by the second network 12 and outputs the states of the tasks o(t+1), o(t+2), . . . , o(t+T) to be executed. If the third network 14 is not provided, the second network 12 may output the tasks o(t+1), o(t+2), . . . , o(t+T) to be executed together with the latent states h(t+1), . . . , h(t+T).

Thus, in the inference apparatus 2, the second network 12 outputs the time-series tasks (more concretely, the prediction of the states of the time-series tasks) o(t+1), . . . , o(t+T), when the output of the first network 10 and the time-series control data u(t), . . . , u(t+T−1), are input.

The inference apparatus 2 compares the time-series tasks o(t+1), . . . , o(t+T) with time-series target data Target(t+1), . . . , Target(t+T), which are tasks that the user wants to execute, and calculates errors. Based on the calculated errors, the inference apparatus 2 updates the time-series control data u(t), u(t+1), . . . , u(t+T−1), which are the input data of the second network 12. The inference apparatus 2 then outputs the updated time-series control data. The inference apparatus 2, for example, outputs the time-series control data to the control target 4 to execute the tasks. In this embodiment, the output time-series control data u(t), u(t+1), . . . , u(t+T−1) are used as inputs to the second network 12 in inference at the next time t+1.

The training apparatus 3 trains the first network 10, the second network 12 and the third network 14, which are used by the inference apparatus 2. The training apparatus 3 in this embodiment inputs the state of the control target 4 through the first network 10 and random time-series inputs u(t), . . . , u(t+T−1) to the second network 12. The training apparatus 3 calculates errors between time-series outputs o(t+1), . . . , o(t+T) of the second network 12 and Target(t+1), . . . , Target(t+T), which are the data indicating the target states, and performs error backward propagation to train the first network 10 and the second network 12.

The training apparatus 3 updates each neural network based on the input and output data as well as the inference apparatus 2. For example, a time series of the control input u( ) is randomly determined and input to the control target 4, and the executed time-series tasks are acquired. The first network 10, the second network 12, and the third network 14 are updated so that when the time-series control inputs are input, the executed time-series tasks are output while using the time-series control inputs and the executed time-series tasks as data indicating the target states.

In addition to the input and output to/from the inference apparatus 2, the training apparatus 3 may further perform outputs for training. For example, as illustrated by dotted lines in FIG. 1, the training apparatus 3 may output various states of the control target 4 based on the state h( ) after one unit time has passed for the focused time of the data input to the second network 12. This state may be, for example, a joint state of the control target 4. More concretely, the joint state, for example, time-series state quantities s(t+1), . . . , s(t+T), indicating the torque, may be output. As another concrete example, images i(t+1), . . . , i(t+T) of the control target 4 may be output. The first network 10 and the second network 12 may be trained by comparing at least one of these joint states and images with desired data to acquire errors.

The training apparatus 3 may be provided with a neural network for outputting these states. For example, the training apparatus 3 may be provided with the fourth network 16 that converts the output h( ) regarding the state of the second network 12 into various states (for example, the joint states) s(t+1), . . . , s(t+T) of the control target 4. The fifth network 18 that converts the output h( ) regarding the state of the second network 12 into the images i(t+1), . . . , i(t+T) may further be provided. The training apparatus 3 may be provided with both the fourth network 16 and the fifth network 18.

In this case, the fourth network 16 and/or the fifth network 18 may be trained in addition to the first network 10, the second network 12, and the third network 14 that are provided in the inference apparatus 2. In this case, the fourth network 16 and/or the fifth network 18 may not be provided in the inference apparatus 2 but may be used to improve accuracy of the training apparatus 3 in training.

(Inference Apparatus)

The inference apparatus 2 in this embodiment will be described below. First, the data input and output of each neural network in the above example will be described. As an example, it is described as a state of the information processing system 1 at the time t that is focused.

First, an initial state $S_{init}(t)$ of the control target 4 at the time t, which is output from the control target 4, is input to the first network 10 to output the latent state h(t) at the time t.

$$h(t) = f_{init}(s_{init}(t)) \tag{1}$$

Here, $f_{init}( )$ indicates conversion by the first network 10.

Next, the second network 12 updates the latent state h(t) based on the latent state h(t) at the time t and the control input u(t) that is input to the control target 4.

$$h(t+1) = f_{update}([h^T(t)u^T(t)]^T) \tag{2}$$

Here, T at a right shoulder represents transposition, and $f_{update}( )$ indicates an update of the latent state by the second network 12. Although not specifically described below, when the second network 12 is the LSTM, a cell state c(t+1) or the like is output as the input for the next time, as appropriate. When the second network 12 is another RNN or other networks, appropriate information is input and output accordingly.

The latent state h(t+1) of the control target at each time output by the second network 12 is input to the third network 14 and a task predicted value o(t+1) is acquired.

$$o(t+1) = f_{out}(h(t+1)) \tag{3}$$

Here, $f_{out}( )$ indicates conversion by the third network 14.

When the fourth network 16 is provided in the training apparatus 3, h(t+1) is input to the fourth network 16, and an inferred value of the state s(t+1) is output.

$$s(t+1) = f_{state}(h(t+1)) \tag{4}$$

Here, $f_{state}( )$ indicates conversion by the fourth network 16.

When the fifth network 18 is provided in the training apparatus 3, h(t+1) is input to the fifth network 18, and the inferred image i(t+1) is output.

$$i(t+1) = f_{image}(h(t+1)) \tag{5}$$

Here, $f_{image}( )$ indicates conversion by the fifth network 18.

For example, as indicated by Mathematical expressions 1 to 5 above, each neural network converts the data.

Next, the inference apparatus 2 and the training apparatus 3 will be described in more detail.

Figure 2:
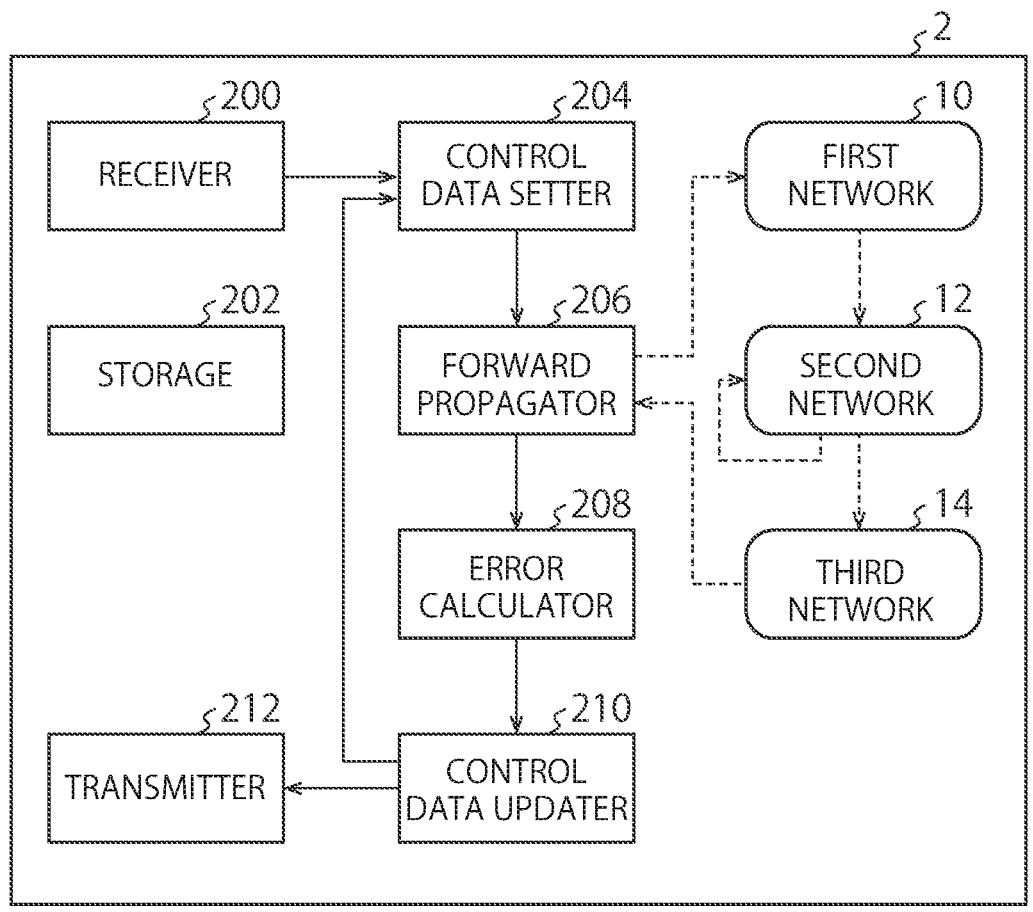
FIG. 2 is a block diagram of an inference apparatus according to one embodiment.

FIG. 2 is a block diagram illustrating a function of the inference apparatus 2 in this embodiment. The inference apparatus 2, for example, is provided with a receiver 200, a storage 202, a control data setter 204, a forward propagator 206, an error calculator 208, a control data updater 210, and a transmitter 212. As targets for forward-propagation, the inference apparatus 2 is provided with the first network 10, the second network 12, and the third network 14. These neural networks are formed in the inference apparatus 2 based on, for example, parameters and other information stored in the storage 202.

The receiver 200 receives state data from the control target 4 that is input to the first network 10. For example, the data of $s_{init}(t)$ at the focused time t is received from the control target 4. The receiver 200 needs not to be directly connected to the control target 4. For example, when data regarding the image of the control target 4 is acquired as the state of the control target 4, the receiver 200 may be connected to a camera that captures the control target 4 or a device that processes and outputs the captured image appropriately (for example, converts into an optical flow). When the image is used as a quantity indicating the state of the control target 4, the optical flow may be used together with the image. Thus, the receiver 200 may be directly connected to the control target 4 or may be connected to the device for acquiring the state of the control target 4.

The storage 202 stores data required in the inference apparatus 2, data to be output or the like. For example, as described above, the parameters and the like of the first network 10, the second network 12, and the third network 14 may be stored in the storage 202, and these neural networks may be generated at the timing when the inference apparatus 2 operates. Data and the like used for inference may be stored as appropriate.

The control data setter 204 generates time-series control data $u0(t), . . . , u0(t+T−1)$ to be input to the second network 12. In an initial state of inference, for example, a minimum value m and a maximum value M are determined and initialization is performed with a random number value between the minimum value m and the maximum value M. Further, the control data setter 204, for example, divides an interval between the minimum value m and the maximum value M by N−2 to generate N−1 pieces of time-series control data of $u1(t) = . . . = u1(t+T−1) = m, u2(t) = . . . = u2(t+T−1) = m+(M−m)/(N−2), . . . , uN−1 (t) = . . . = uN−1 (t+T−1) = M$, and may generate a total of N pieces of time-series control data u(t) together with u0(t) above by batch processing.

The forward propagator 206 outputs time-series task predicted values based on the state data of the control target 4 received by the receiver 200 and the time-series control data generated by the control data setter 204. Concretely, the forward propagator 206 inputs the state data of the control target 4 to the first network 10. Subsequently, the forward propagator 206 inputs the output of the first network 10 and the control data u(t) to the second network 12 to acquire the latent state h(t+1). This latent state h(t+1) is input to the third network to acquire the task predicted value o(t+1).

When the control target 4 has a flexible body, it is difficult to infer the next state of the control target 4 for the control input based only on the joint states of the control target 4, for example, physical quantities such as acceleration and torque. Therefore, by using the latent states and the control inputs in the second network 12, which can handle the latent states sequentially, it is possible to describe the latent state in addition to the mechanically acquirable state of the control target 4. For example, it is possible to sequentially infer the latent states taking into account the sequentially given control inputs. As a result, the accuracy of output data can be improved even when the body is flexible.

Subsequently, the latent state h(t+1) and the control data u(t+1) are input to the second network 12 to acquire the latent state h(t+2). This latent state h(t+2) is input to the third network 14, to acquire a task predicted value o(t+2). The input and output of the second network 12 and the third network 14 are repeated for a predetermined amount of data for the predetermined time T, for example. Finally, the forward propagator 206 inputs the latent state h(t+T−1) and the control data u(t+T−1) to the second network 12, acquires the latent state h(t+T), and inputs this latent state h(t+T) to the third network 14 to acquire the task predicted value o(t+T).

Thus, the forward propagator 206 acquires the time-series task predicted values o(t), . . . , o(t+T) based on the received data regarding the states of the control target 4.

When the control data setter 204 generates the N-pieces of time-series control data by batch processing, each time series is used as the input to the second network 12, and forward propagation is performed by batch processing in the same way as above. Then, the forward propagator 206 acquires the N-pieces of time-series task predicted values by batch processing. This forward propagation may, for example, be processed in parallel using separate arithmetic cores of a GPU (graphics processing unit).

The error calculator 208 acquires an error between the time-series task predicted value acquired by the forward propagator 206 and data indicating a time-series of target states. Here, the data indicating the target state is data of the task to be executed. That is, the error calculator 208 calculates a loss $L_c$ by comparing the data of the task to be executed with the data of the task predicted value.

The loss $L_c$ is calculated, for example, by the following expression.

$$L_c = \sum_{t+1}^{t+T} \text{loss}_c(t) \tag{6}$$

$$\text{loss}_c(t) = \begin{cases} \alpha(\text{Target}(t) - o(t))^2, & \text{if Target}(t) > 0 \\ (\text{Target}(t) - o(t))^2, & \text{else} \end{cases}$$

Here, $\alpha$ is a number greater than 1. Thus, by increasing the value of the loss to take the sum when the value of Target( ) is greater than 0, it is avoided that the inference with o(t)=0 at all t is evaluated as good inference in a sparse task where results of most tasks are 0. For example, $\alpha$ should be set sufficiently larger than 1, such as 10. For example, $\alpha$ may be linked to a value of the predetermined time T.

The control data updater 210 updates the control data u(t) based on the loss $L_c$ calculated by the error calculator 208. For example, the update is performed based on the following expressions.

$$g = \frac{dL_c}{du} \tag{7}$$

$$u_{updated} = u - \frac{\gamma g}{|g|} \tag{8}$$

Here $\gamma$ is a coefficient on the update, g is a gradient of $L_c$ with respect to u, and $u_{updated}$ is the updated control input u.

When N-pieces of control data are acquired by batch processing, the error calculator 208 outputs the loss $L_c$ in each batch, and the control data updater 210 updates u(t) by using the control data u(t), which gives the smallest among the acquired loss $L_c$.

Further, although the control data updater 210 may take $\gamma$ as a predetermined value, batch processing can also be performed in this process. That is, a maximum value $\gamma_{max}$ of $\gamma$ is set, and the processes of Mathematical expressions 7, 8 are executed by batch processing with $\gamma=\gamma_{max}/N2, 2\gamma_{max}/N2,$ . . . , $\gamma_{max}$. Then, using the control input u(t) acquired by this batch processing to perform the forward propagation again to acquire the one with the smallest loss $L_c$ and based on this control input, the control input $u_{updated}(\ )$ updated by Mathematical expressions 7, 8 may be acquired.

The transmitter 212 outputs a control input $u_{updated}(t+1)$ corresponding to the time t+1 among the updated control inputs to the control target 4. The control target 4 uses this control input to control, for example, the torque of the joint, and the like.

After the control target 4 executes a task based on the control output described above, the inference apparatus 2 receives data indicating the state of the control target 4 from the control target 4 and moves to a step of inferring the control input u(t+1) at the next time t+1. The inference at the time t+1 may be performed based on $u_{updated}(t+1)$, . . . , $u_{updated}(t+T−1)$ acquired by the control data updater 210, as described below.

For example, new initial values of u(t+1), . . . , u(t+T−1) may be generated based on $u_{updated}(t+1)$, . . . , $u_{updated}(t+T−1)$ at the previous time updated by the control data updater 210. For example, the control data setter 204 may set the control data u(t+1), . . . , u(t+T) where u(t+T)=$u_{updated}$(t+T+1) (T∈[1, T−2]), u(t+T−1)=$u_{updated}$(t+T−1) as the new control data u. The forward propagator 206 may repeat the above inference with these new control data u(t+1), . . . , u(t+T) as inputs to the second network 12. In this manner, a new control input may be generated based on the updated control input at the time one unit time before, shifted by one unit time. In this way, past inference results may be used in the inference at the current time. It is not limited to only one unit time before, but the past result, which is obtained at the time before smaller than T, may be used as a candidate.

In the case of batch processing, for example, u0, which was set by a random number in the above, may be used by shifting the control input updated at the previous time. In this case, furthermore, the minimum value m and the maximum value M of u0 may be divided into N−2 equal parts to generate the control input to be used for other batches in the same manner as above.

Figure 3:
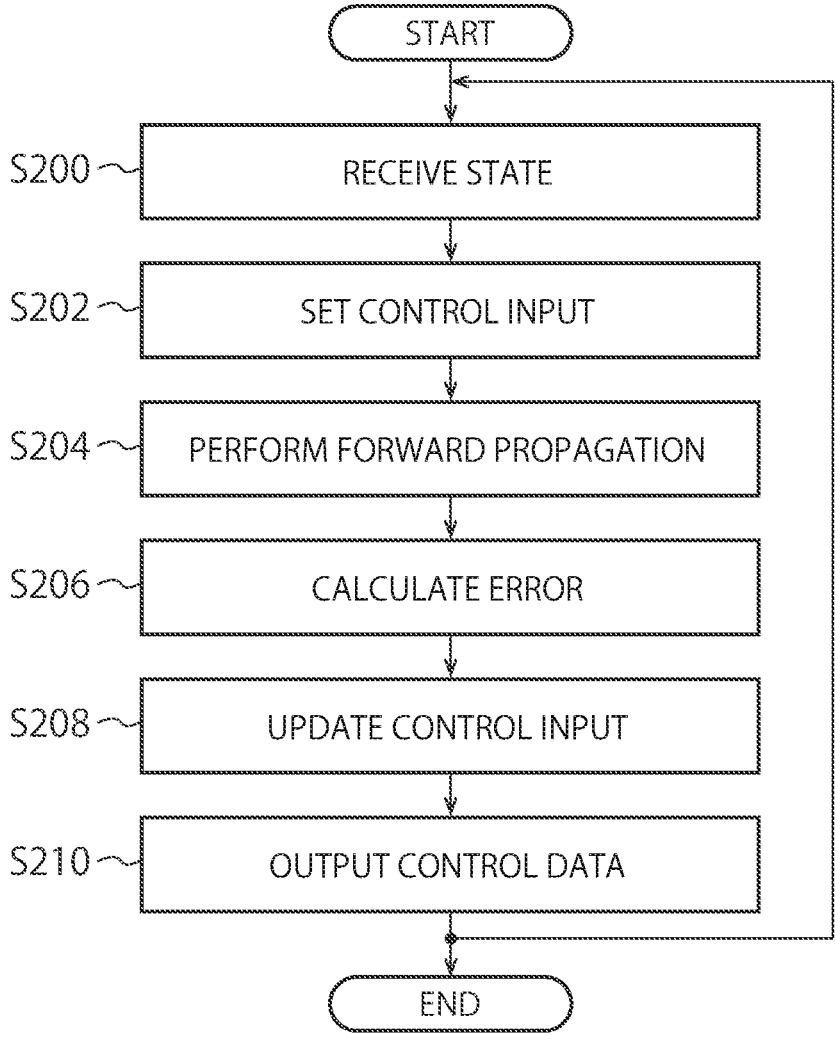
FIG. 3 is a flowchart illustrating processing of the inference apparatus according to one embodiment.

FIG. 3 is a flowchart illustrating a process flow of the inference apparatus 2 in this embodiment.

First, the receiver 200 acquires the data indicating the state of the control target 4 from the control target 4 (S200). Next, the control data setter 204 sets the initial value of the time-series control input u(t) (S202). In the case of batch processing, the control data setter 204 sets initial values of the time-series control inputs u(t) whose number is equal to the number of batches N.

Next, the forward propagator 206 forward-propagates the first network 10, the second network 12, and the third network 14 based on the data received by the receiver 200 and the data set by the control data setter 204, and outputs the time-series task predicted value, which is an inferred value of the task (S204). In the case of batch processing, the forward propagator 206 performs forward-propagation processing as much as corresponds to the control inputs u(t) for the number of batches N and acquires the time-series task predicted values for the number of batches N.

Next, the error calculator 208 compares the time-series task predicted value o with the time-series target data Target (data indicating the target state) and calculates the error, the loss $L_c$ (S206). The time-series target data is the data indicating the result of the task to be executed when the user controls the control target 4. The time-series target data may be a time-series of states of deliverable produced by the control target 4 controlled. For example, if the task is to play a drum, information such as what frequency band and what intensity of sound is played at what time is set as a time series of this task to be executed. For another example, if the task is to produce a target chemical compound, information such as what amount of the target chemical compound is produced at what time is set as a time series of this task to be executed. When N-pieces of control inputs are set by batch processing, the error calculator 208 calculates the loss $L_c$ for the inferred task predicted value in each batch.

Next, the control data updater 210 updates the control input based on the error calculated by the error calculator 208 (S208). When N-pieces of control inputs are set by batch processing, the control input u, which outputs the smallest loss $L_c$ among the N-pieces of losses, is acquired, and this control input is updated to make it a new control input. As mentioned above, a second batch process may be performed here. The same number of γs in Mathematical expressions 7, 8 as the number of batches N2 may be prepared, the control input is updated for each γ, it is forward-propagated again, and the updated u, which has the smallest loss, may be used as a new time-series control input.

In the above, each batch process may be processed in parallel, for example, using separate arithmetic cores in the GPU, respectively.

Next, the transmitter 212 outputs the control input value $u_{updated}(t+1)$ at the time t+1 in the control inputs updated by the control data updater 210 to the control target 4 as the control data (S210).

The control target 4, for which the control data at the time t+1 is given, is controlled based on the control data to be a new state. This new state is transmitted to the receiver 200, and an inference process by the inference apparatus 2 is repeated. As mentioned above, the control input from the time t+1 is set based on the control data updated by the control data updater 210 at the previous time t.

As mentioned above, according to this embodiment, it is possible to have the control target having the flexible body execute a dynamic task by updating and outputting the control data by comparing the inferred data of the time-series tasks using the RNN with an execution state of a desired task. For example, when a sparse task, such as a task to make a drum sound, is executed, the loss used to update the control data is evaluated in accordance with the task to be executed, resulting in that the inference of the control for the sparse task can be executed with high accuracy. The sparse task includes, for example, throwing an object, hitting a nail with a hammer, and the like, but the inference apparatus 2 in this embodiment can be applied without being limited to these examples.

(Training Apparatus 3)

The training apparatus 3 for training the inference apparatus 2 will be described. The training apparatus 3 first accumulates the data indicating the target state. For example, the time-series control input u(t) is set as a random number in a range of arbitrary t. In that case, the kind of task Target(t), which is output, is acquired and accumulated as the data indicating the target state. Similarly, the data indicating the state of the control target 4 used as the input data of the first network 10, for example, the data indicating the joint state, or the image data, the optical flow data, are acquired and accumulated.

In addition to the above, training of the fourth network 16 and the fifth network 18, which are not used in the inference apparatus 2, and which output state data and image data, may be performed at the same timing to improve effectiveness of parameter optimization from the first network 10 to the third network 14. In such an implementation, the training apparatus 3 acquires time-series state data s(t) and time-series image data i(t) at the same timing in addition to the control input o(t) and task Target(t) described above and uses the data as the data indicating the target state.

These data are combined and accumulated as needed. For example, the data of the joint state, the data of the control input, and the data of the task may be combined and accumulated. As another example, the data of the joint state, images, the data of the optical flow, the data of the control input, and the data of the task may be accumulated. For example, the time-series data of the same joint state can be used as the data indicating the target state of both the input data of the first network 10 and the output data of the fourth network 16. For example, the same time-series data may be used, such as inputting the data s(t) indicating the joint state and outputting the data s(t+1) indicating the joint state. The same time-series data can be used for images as well for input and output.

Figure 4:
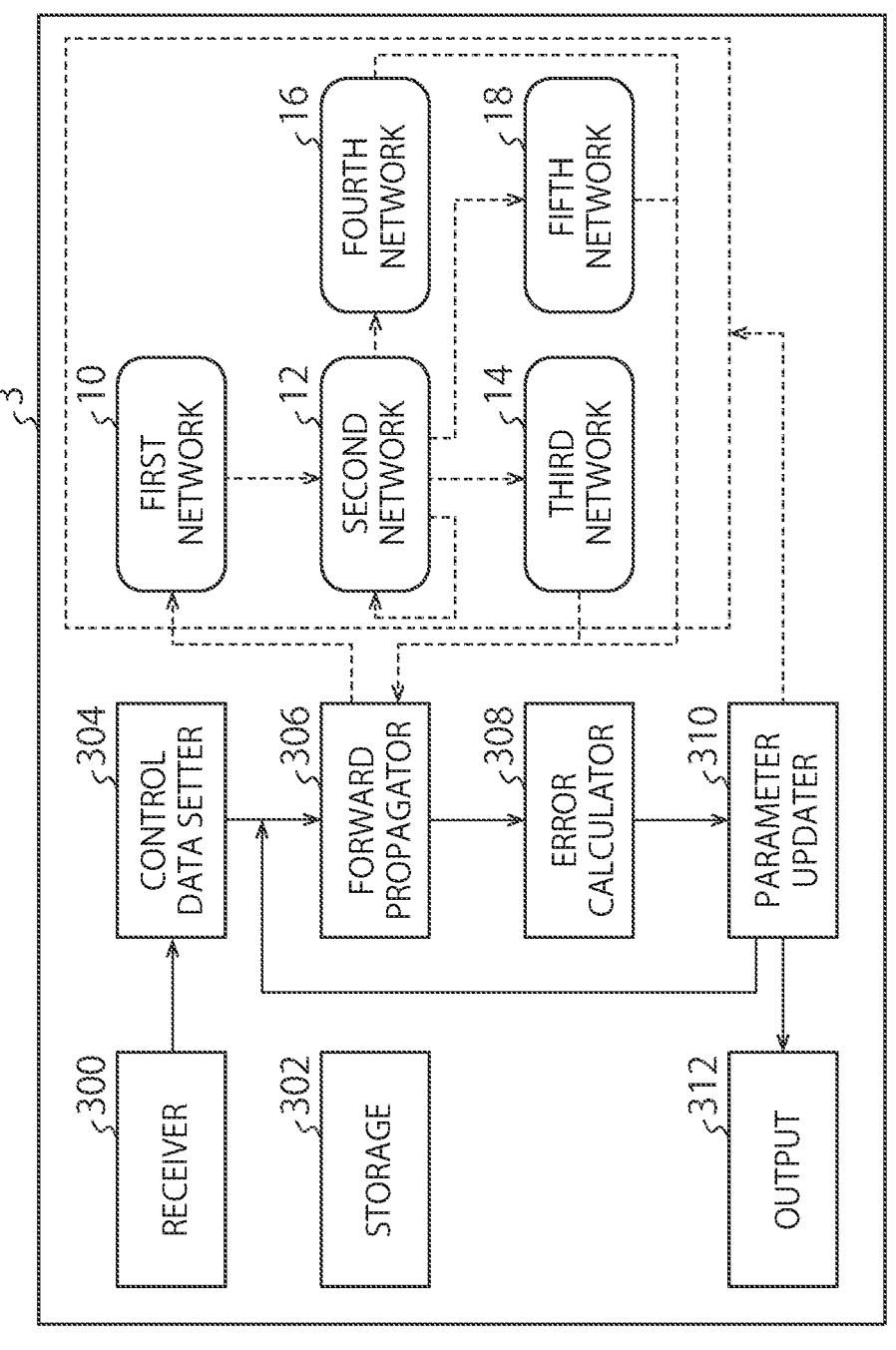
FIG. 4 is a block diagram of a training apparatus according to one embodiment.

FIG. 4 is a block diagram illustrating an example of the training apparatus 3 in this embodiment. The training apparatus 3 is provided with a receiver 300, a storage 302, a control data setter 304, a forward propagator 306, an error calculator 308, a parameter updater 310, and a transmitter 312. The training apparatus 3 is provided with at least the first network 10, the second network 12, and the third network 14 as targets of the neural networks to be trained. The training apparatus 3 is also optionally provided with the fourth network 16 and the fifth network 18. These neural networks are formed in the training apparatus 3 based on, for example, parameters and the like stored in the storage 302.

The fourth network 16 acquires data regarding the state of the control target 4, for example, data regarding the joint, such as velocity, acceleration, or torque, from the latent state output by the second network 12. The fifth network 18 acquires the image of the control target 4 from the latent state output by the second network 12.

Hereinafter, it is described on the assumption that both the fourth network 16 and the fifth network 18 are provided in the training apparatus 3. It should be noted that when at least one of them is not provided, the training apparatus 3 has a configuration where the description of the relevant part is omitted.

The receiver 300 receives at least one of the data from the control target 4 and the data regarding the image of the control target 4 taken by a camera or the like. Since the same data is received as that of the receiver 200 in the inference apparatus 2, the details are omitted.

The storage 302 stores data necessary for operations of the training apparatus 3, input/output data of the training apparatus 3, and the like. For example, the data indicating the target states accumulated for training each neural network may be stored in the storage 302. Since the training data is often a huge amount of data, the storage 302 may not only be provided inside the training apparatus 3 but may also be provided in a file server or the like outside the training apparatus 3 through a communication line or the like.

The control data setter 304 acquires the control input u(t) out of the data indicating the target states stored in the storage 302 and sets it as the input data of the second network 12.

The forward propagator 306 acquires the data indicating the state of the control target 4 out of the data indicating the target states stored in the storage 302 and acquires an initial latent state as the input to the first network 10. The acquired latent state and the control input set by the control data setter 304 are input to the second network 12, and the latent state at the next time is acquired.

The forward propagator 306 inputs the acquired latent state to the third network 14, the fourth network 16, and the fifth network 18, and the inferred value of the task, an inferred value of the control target 4, and an inferred value of the image of the control target 4 are output from each of the networks.

The forward propagator 306 determines a predetermined number of times $T_{train}$ to deploy the second network 12, and after inputting the output from the first network 10 to the second network 12, the forward propagator 306 forward-propagates the second network 12 for the $T_{train}$ times. More concretely, the forward propagator 306 inputs u(t+i) ($0<=i<T_{train}$) to the second network, acquires h(t+1), . . . , h(t+$T_{train}$) and then further acquires the tasks o(t+1), . . . , o(t+$T_{train}$) inferred through the third network 14, the states s(t+1), . . . , s(t+$T_{train}$) of the control target 4 inferred through the fourth network 16, and the images i(t+1), . . . , i(t+$T_{train}$) of the control target 4 inferred through the fifth network 18, respectively. The number of times $T_{train}$ deploying the second network 12 in the training apparatus 3 is preferably greater than the predetermined time T in the inference apparatus 2.

The error calculator 308 calculates an error by comparing each of the time-series data acquired in the forward propagator 306 with the data indicating the target states. For each time series, for example, a loss is calculated using the following loss function.

$$L_{train}=L_j+L_i+L_o \qquad (9)$$

Here, $L_j$ is the loss regarding the joint state, $L_i$ is the loss regarding the image, and $L_o$ is the loss regarding the task.

For example, $L_j$ is obtained by calculating a mean square error with respect to the time between the inferred joint state and a joint state of the data indicating the target state and integrating a predetermined coefficient. Similarly, $L_i$ is obtained by calculating a mean square error with respect to the time between the inferred image and the image of the data indicating the target state and integrating a predetermined coefficient. $L_o$ is equivalent to $L_c$ described in Mathematical expression 6 and is obtained by calculating an error between the inferred value of the task and an execution value of the task of the data indicating the target state. That is, $L_c$ is the loss adjusted to be able to correspond to the sparse tasks. The error calculator 308 calculates the loss based on the expression of Mathematical expression 9.

For the image, for example, the data indicating the target state may be binarized to the actually acquired data. Further, the data indicating the target state may be the data that is processed by delaying, closing, or the like after binarization. By processing the data in this manner, it is possible to evaluate the loss to the extent that some blurring can be tolerated even when there is blurring in a movement of the control target 4.

The parameter updater 310 performs an error backward-propagation process based on the loss calculated by the error calculator 308 to update parameters of each neural network. This optimization may be performed based on any machine learning technique. Termination conditions of the training may also be set based on a general machine learning technique.

Figure 5:
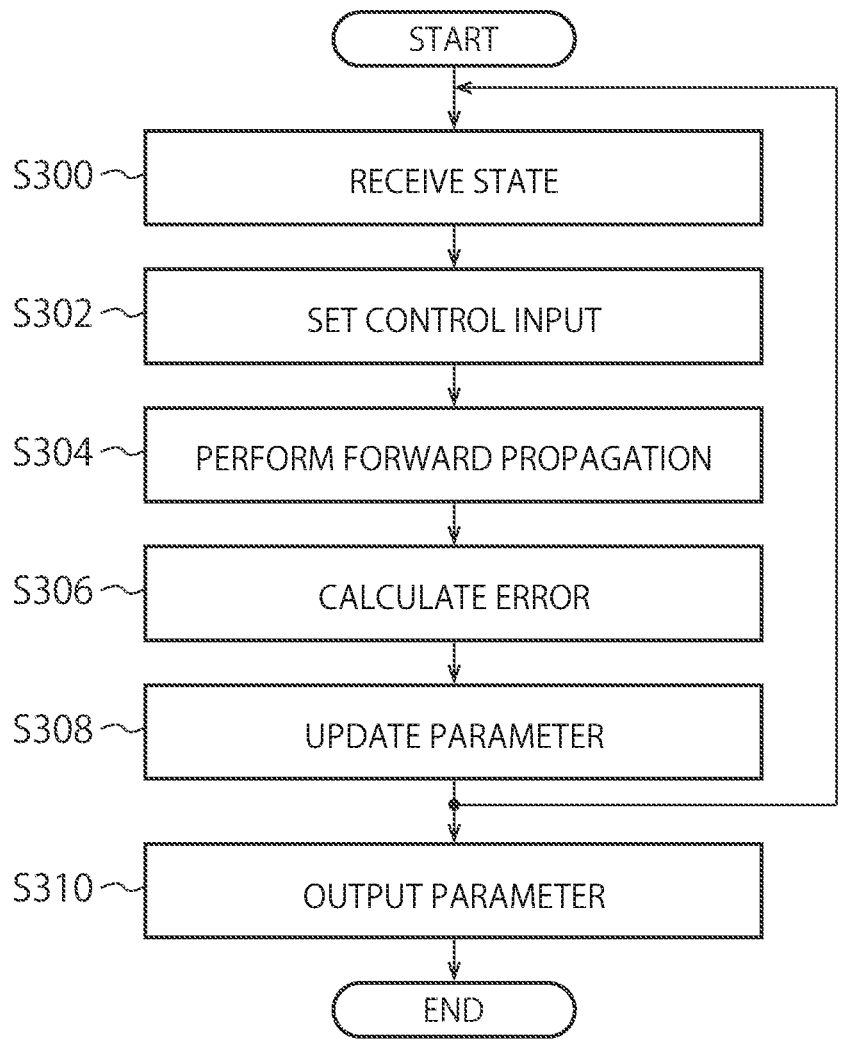
FIG. 5 is a flowchart illustrating processing of the training apparatus according to one embodiment.

FIG. 5 is a flowchart illustrating a process flow of the training apparatus 3 in one embodiment. It is assumed that the data indicating the target states acquired in advance by the above procedure are stored in the storage 302, which is provided inside or outside the training apparatus 3.

First, the receiver 300 receives the state of the control target 4 (S300). In this case, receiving may be a concept that includes, for example, acquiring the joint state data of the control target 4 or the image data (including the optical flow) out of the data indicating the target states stored in the storage 302. The image data and the optical flow may be acquired separately, and both of these may be used as the data indicating the target states.

Next, the control data setter 304 sets the control input (S302). The control data setter 304 acquires, for example, the control inputs u($t_0$) to u($t_0$+$T_{train}$), which are time-series data from time $t_0$ for $T_{train}$ in the data indicating the target states stored in the storage 302, and sets them as inputs of the second network 12.

Next, the forward propagator 306 inputs necessary data to the first network 10, the second network 12, the third network 14, the fourth network 16, and the fifth network 18, and performs the forward-propagation process (S304).

Next, the error calculator 308 calculates the error for each of the output time-series data (S306). The error calculator 308, for example, performs the process of S304 based on the time-series data from the time $t_0$ and compares the inferred joint states s($t_0$+1) to s($t_0$+$T_{train}$), the inferred images i($t_0$+1) to i($t_0$+$T_{train}$), and the inferred tasks o($t_0$+1) to o($t_0$+$T_{train}$) with the data indicating corresponding target states for each, finds loss for each data, and then calculates overall loss based on Mathematical expression 9.

Next, the parameter updater 310 performs the error backward-propagation process based on the error calculated by the error calculator 308 and updates the parameter of each neural network (S308). The update of the parameter is repeated until appropriate termination conditions are satisfied.

The processes from S300 to S308 are repeated until the termination conditions of the training are satisfied. After satisfying the termination conditions, the training apparatus 3 terminates the training and outputs the optimized parameters (S310). Here, the output is a concept that includes outputting the parameters outside the training apparatus 3 as well as storing them in the storage 302.

The inference apparatus 2 uses these optimized parameters to configure the first network 10, the second network 12, and the third network 14 to perform the inference process.

As mentioned above, according to the present embodiment, the training apparatus 3 can optimize each neural network by comparing the inferred data of the time-series tasks using the RNN and the execution data of the desired tasks. Furthermore, by using the joint states and images of the control target 4 as the data indicating the target states, it is possible to optimize the second network 12, which infers the latent states more accurately from information other than the tasks to be executed. As with the inference apparatus 2 described above, by optimizing the parameters in this manner, it is possible to optimize the neural network for making the control target having the flexible body perform the dynamic task, especially the sparse task.

The inference apparatus 2 and the training apparatus 3 can handle not only sparse tasks but also any task for which a task state can be defined in a unified manner as well. By predicting the state of the control target 4 by the training apparatus 3, the neural network that performs the inference can be trained with higher accuracy compared to the case of no prediction. The predetermined time T is not fixed to the trained neural network and may be set arbitrarily at the time of inference. That is, the predetermined time T can be determined without retraining.

The following is a brief overview of the information processing system 1, in particular, each neural network.

Figure 6:
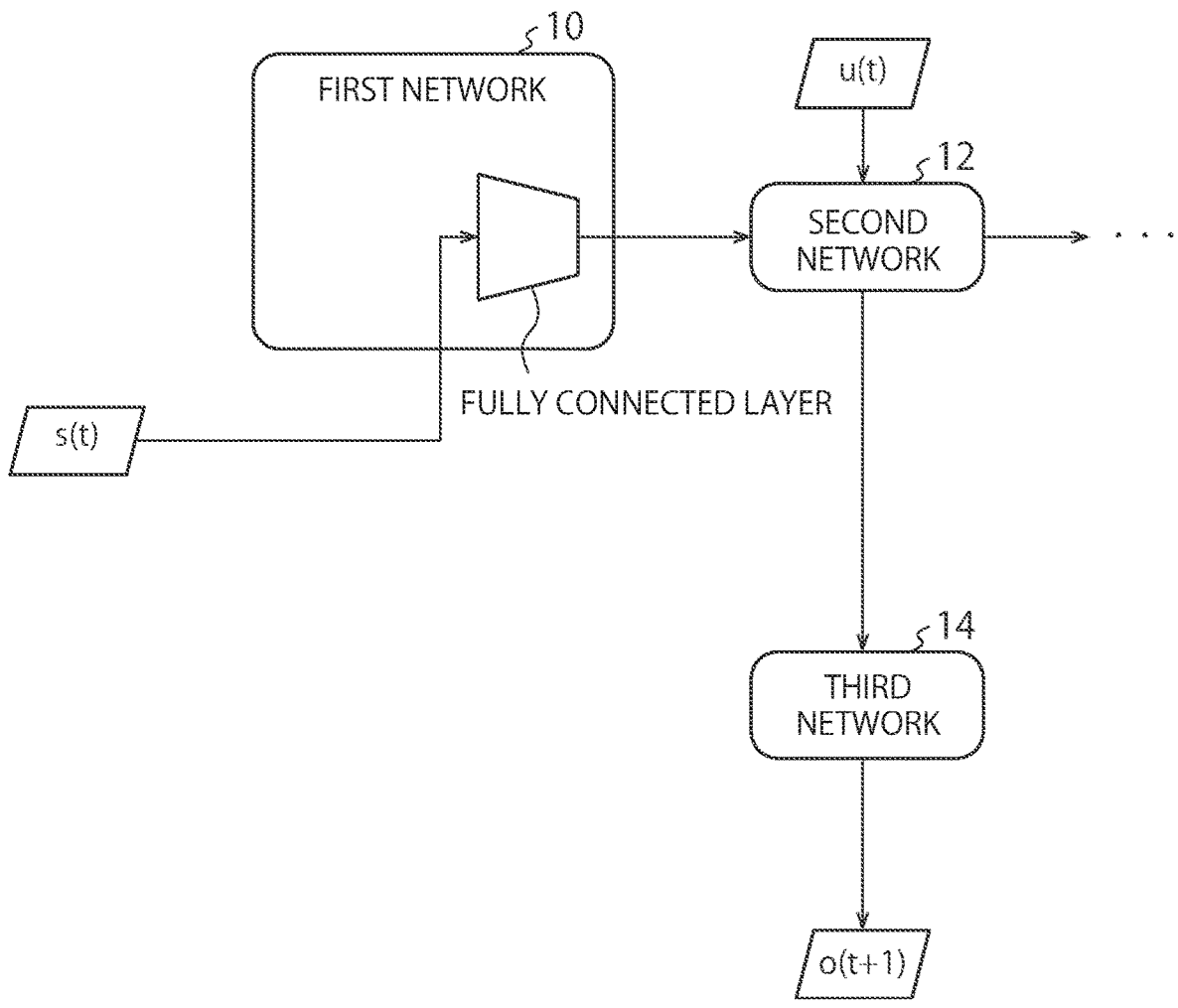
FIG. 6 is a diagram illustrating a connection of neural networks according to one embodiment.

FIG. 6 is a diagram illustrating an example of a neural network connection. The inference apparatus 2 outputs the task predicted value o(t+1) when the joint state s(t) is input. The training apparatus 3 optimizes the first network 10, the second network 12, and the third network 14 so that the task predicted value o(t+1) is output when the joint state s(t) is input.

In the following diagrams and descriptions, it is assumed that the first network 10 is provided with the fully connected layer, but as mentioned above, it is not limited thereto, and the first network 10 may not be provided with the fully connected layer as long as the output is properly acquired. Similarly, the second network 12 is described as the RNN, but is not limited thereto, and may be any model as described above.

The second network 12 may first be trained as a network such as the LSTM, for example, further, the second network 12 may be configured as a network that is not the RNN by using the trained parameters, and then, fine-tuned and so forth.

In this case, the first network 10 is provided with the fully connected layer where, for example, quantities indicating the joint states are input. The data is converted to the latent state through the fully connected layer and the input data of the second network 12 is acquired.

Figure 7:
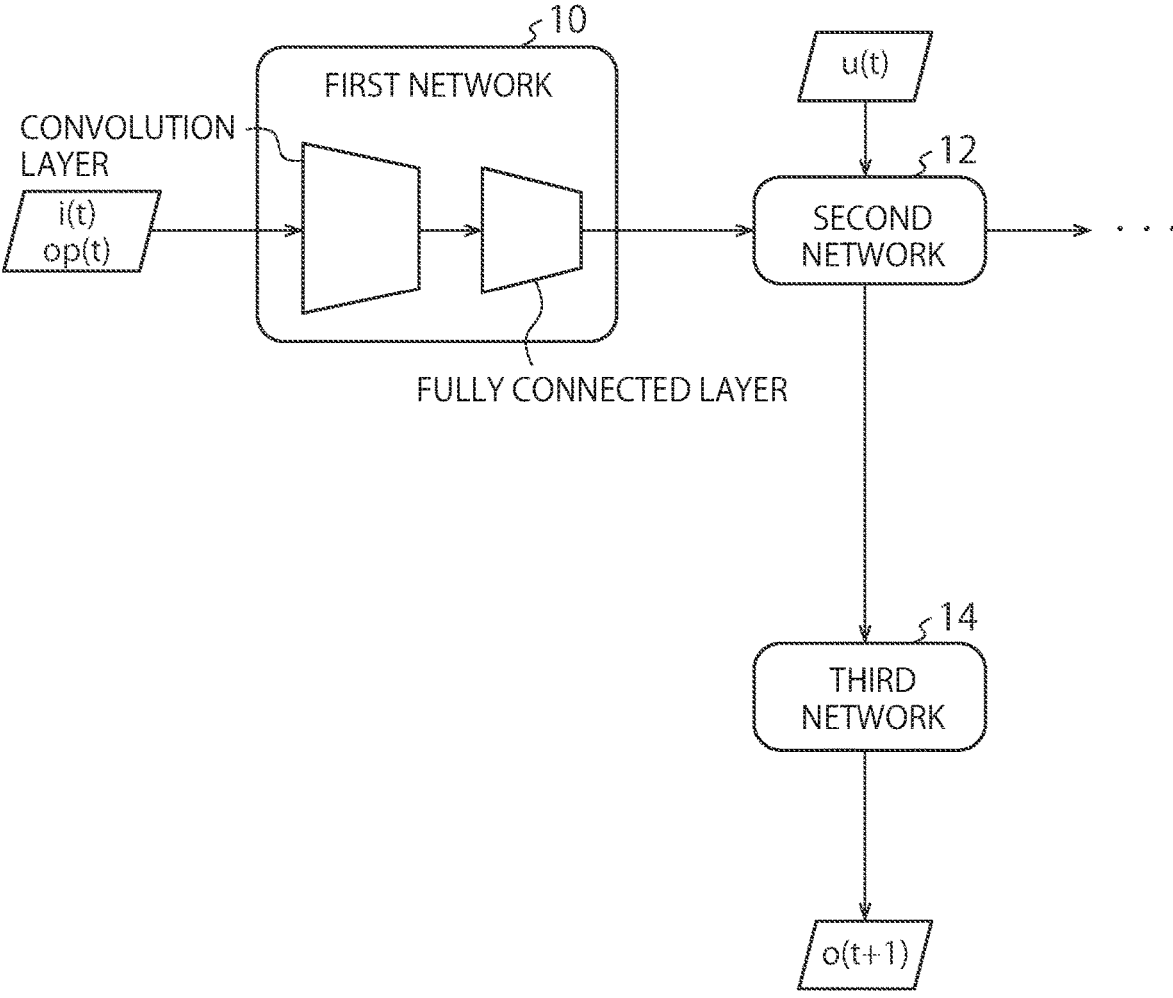
FIG. 7 is a diagram illustrating the connection of the neural networks according to one embodiment.

FIG. 7 is a diagram illustrating another example of the neural network connection. When the image i(t) of the control target 4 and the optical flow op(t) are input, the inference apparatus 2 outputs the task predicted value o(t+1). The training apparatus 3 optimizes the first network 10, the second network 12, and the third network 14 so that the task predicted value o(t+1) is output when the image i(t) of the control target 4 and the optical flow op(t) are input.

In this case, the first network 10 is provided with, for example, a three-channel convolution layer into which the image (e.g. the gray-scale image) and optical flow are input and a fully connected layer to which the output from the convolution layer is input.

Figure 8:
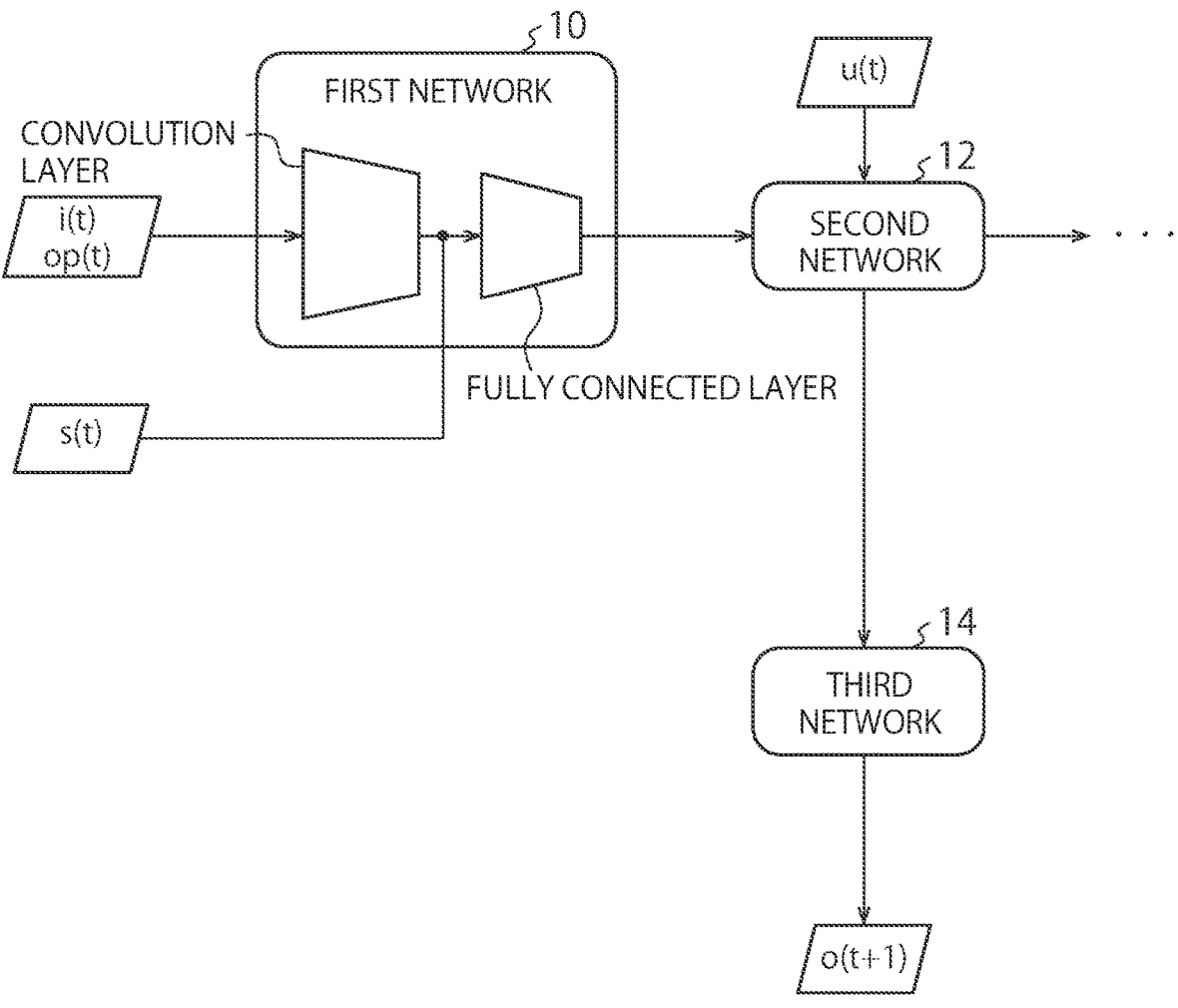
FIG. 8 is a diagram illustrating the connection of the neural networks according to one embodiment.

FIG. 8 is a diagram illustrating still another example of the neural network connection. The inference apparatus 2 outputs the task predicted value o(t+1) when the joint state s(t), the image i(t) of the control target 4, and the optical flow op(t) are input. The training apparatus 3 optimizes the first network 10, the second network 12, and the third network 14 so that the task predicted value o(t+1) is output when the joint state s(t), the image i(t) of the control target 4, and the optical flow op(t) are input.

In this case, the first network 10 is provided with, for example, the three-channel convolution layer where the image and optical flow are input, and the fully connected layer where the output from the convolution layer and the joint state are input.

Figure 9:
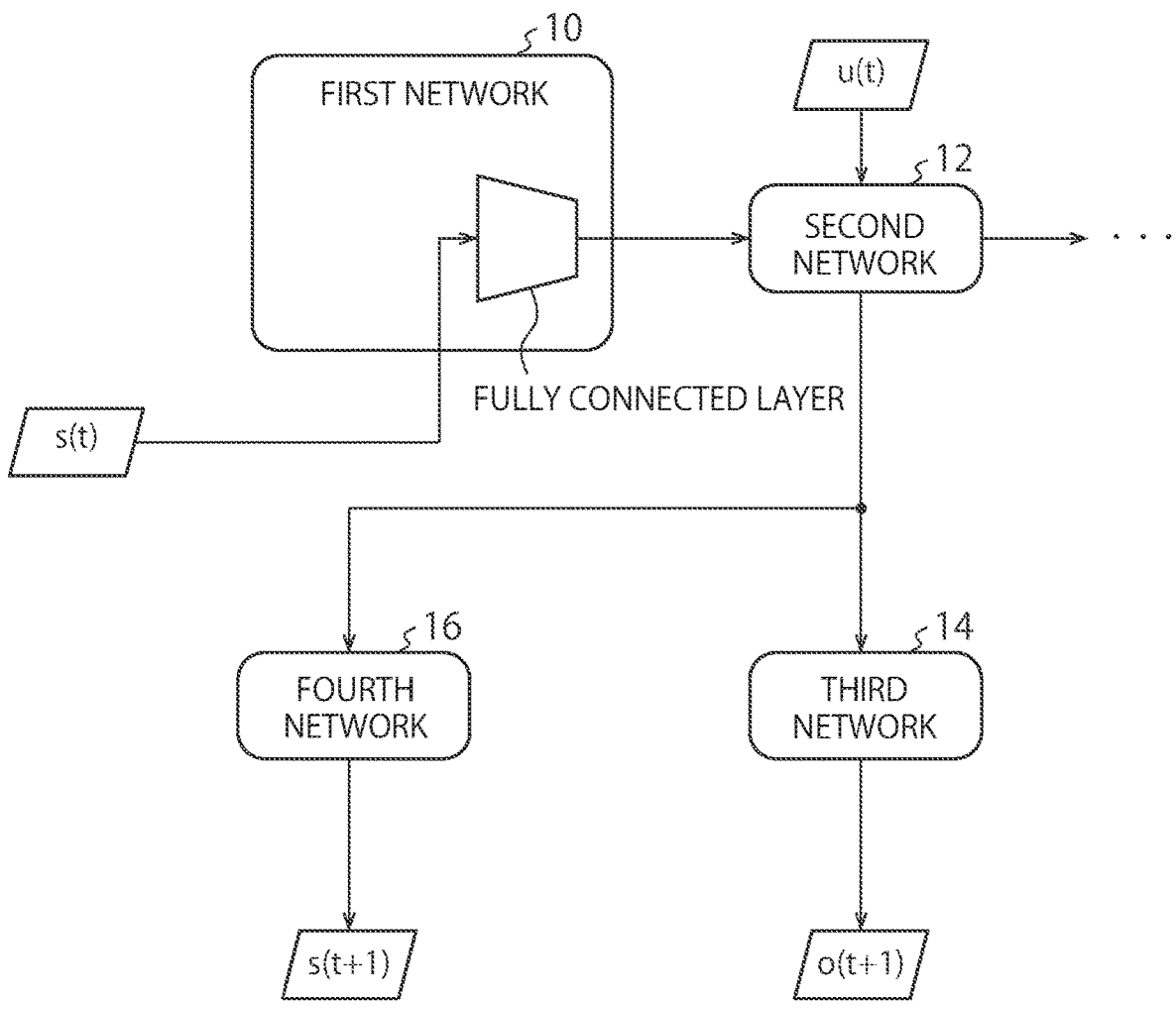
FIG. 9 is a diagram illustrating the connection of the neural networks according to one embodiment.

FIG. 9 is a diagram illustrating another example of the neural network connection. The inference apparatus 2 outputs the task predicted value o(t+1) when the joint state s(t) is input. The training apparatus 3 optimizes the first network 10, the second network 12, the third network 14, and the fourth network 16 so that the task predicted value o(t+1) and the joint state s(t+1) are output when the joint state s(t) is input.

In this case, the first network 10 is provided with the fully connected layer where, for example, the quantities indicating the joint state are input. The fourth network 16 is provided with the fully connected layer having the opposite structure to the fully connected layer of the first network 10 and converts the latent state output from the second network 12 into the joint state.

Figure 10:
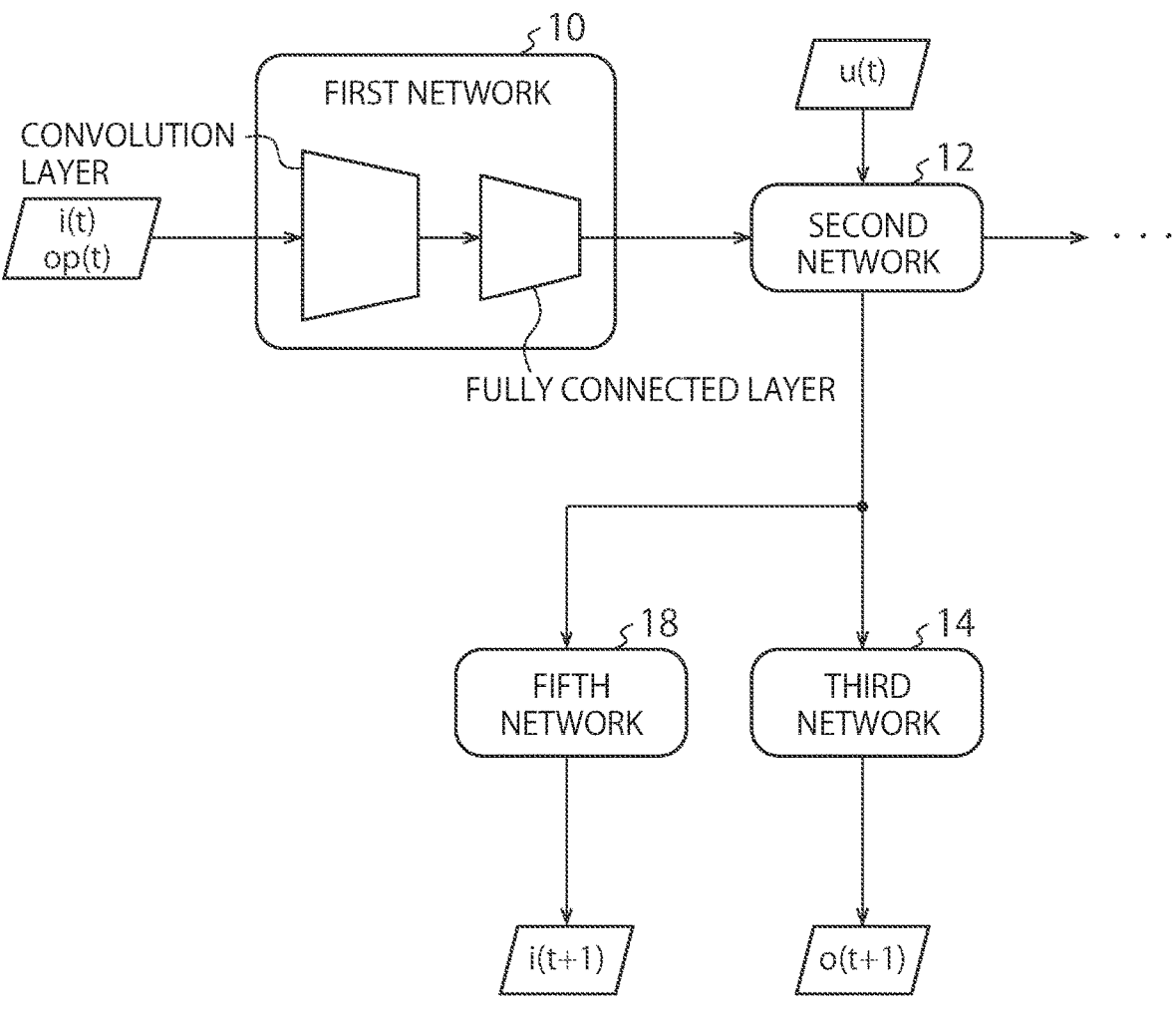
FIG. 10 is a diagram illustrating the connection of the neural networks according to one embodiment.

FIG. 10 is a diagram illustrating still another example of the neural network connection. The inference apparatus 2 outputs the task predicted value o(t+1) when the image i(t) of the control target 4 and the optical flow op(t) are input. The training apparatus 3 optimizes the first network 10, the second network 12, the third network 14, and the fifth network 18 so that the task predicted value o(t+1) and the image i(t+1) of the control target 4 are output when the image i(t) of the control target 4 and the optical flow op(t) are input.

In this case, the first network 10 is provided with, for example, the three-channel convolution layer where the image and optical flow are input, and the fully connected layer where the output from the convolution layer is input. The fifth network 18 is provided with the fully connected layer having the opposite structure to the fully connected layer of the first network 10, and the convolution layer where the output of the fully connected layer is input to an input layer, the structure is opposite to the convolution layer of the first network 10, and the output is one channel. The neural network of such a structure converts the latent state output by the second network 12 into the image of the control target 4.

Figure 11:
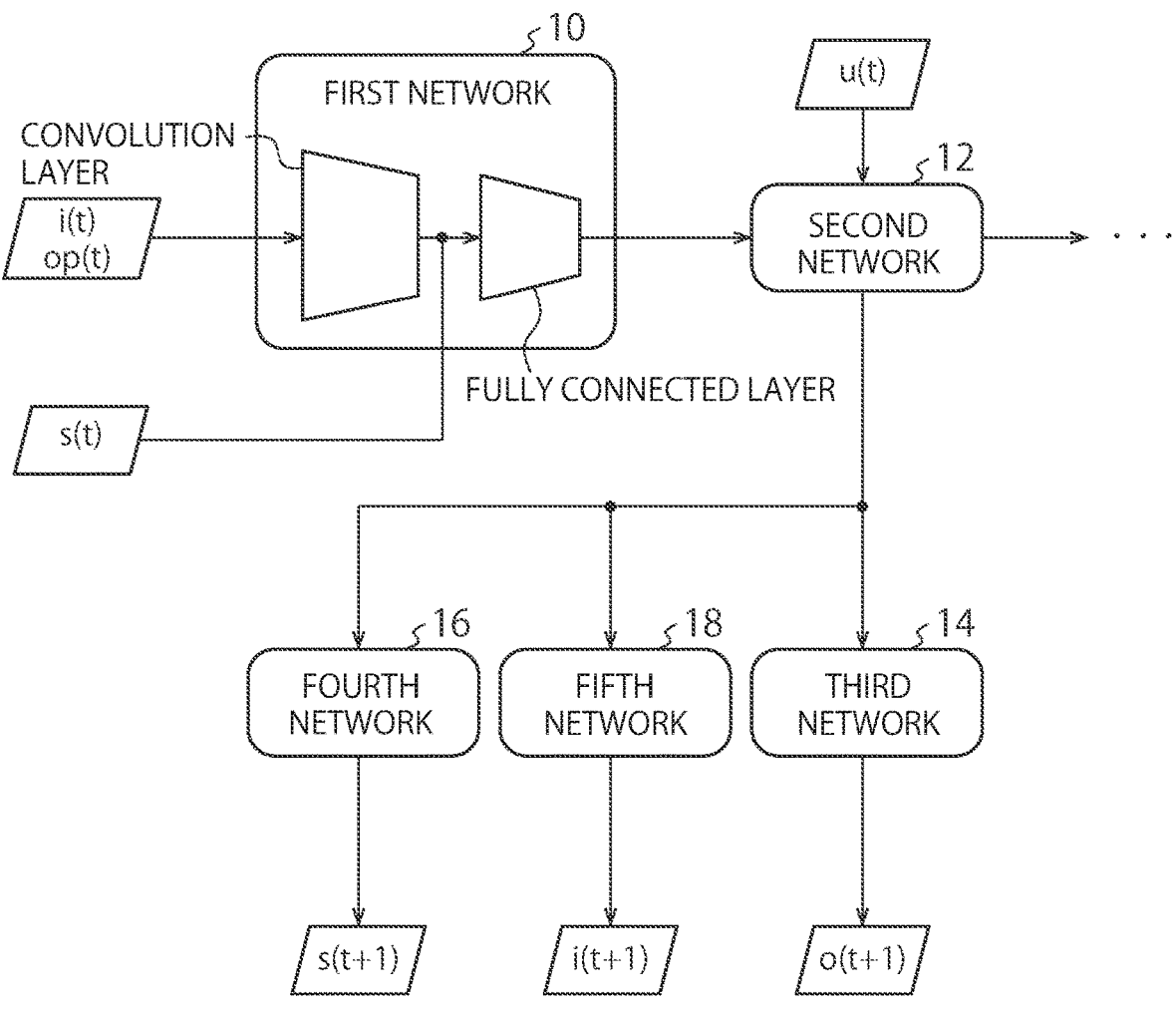
FIG. 11 is a diagram illustrating the connection of the neural networks according to one embodiment.

FIG. 11 is a diagram illustrating yet another example of the neural network connection. The inference apparatus 2 outputs the task predicted value o(t+1) when the joint state s(t), the image i(t) of the control target 4, and the optical flow op(t) are input. The training apparatus 3 optimizes the first network 10, the second network 12, the third network 14, the fourth network 16, and the fifth network 18 so that the task predicted value o(t+1), the joint state s(t+1) and the image i(t+1) of the control target 4 are output when the joint state s(t), the image i(t) of the control target 4, and the optical flow op(t) are input.

In this case, the first network 10 is provided with the fully connected layer where, for example, the quantity indicating the joint state is input. The fourth network 16 is provided with the fully connected layer having the opposite structure to the fully connected layer of the first network 10 and converts the latent state output from the second network 12 into the joint state. The fifth network 18 is provided with the fully connected layer having the opposite structure to the fully connected layer of the first network 10 and the convolution layer where the output of the fully connected layer is input to an input layer, and a structure is opposite to the convolution layer of the first network 10, and the output is one channel. The neural network of such a structure converts the latent state output by the second network 12 into the image of the control target 4.

Thus, a combination of the neural networks that are provided in the inference apparatus 2 and the training apparatus 3 and a combination of input/output data can be modified in various modes.

In a concrete example, the inference apparatus 2 controls the control target 4 having the flexible body to beat a drum and infers sound (i.e. deliverables) emitted by the drum as a task to be executed. The sound of the drum is collected by a microphone. The collected sound is converted to a spectrum by fast Fourier transformation. From this spectrum, the frequency and size of the sound with respect to the task are acquired. For example, whether or not the sound is noise is determined based on whether the loudness of the sound and the frequency of the acquired sound exist in a predetermined frequency band. The image may be binarized, reduced in size, performed a background subtraction process, blurred, binarized with a threshold value, and performed a closing process.

In another concrete example, the inference apparatus 2 controls the plant having one or more valve adjusting a state, such as temperature, flow, pressure, level, density and so on, in the industrial process to produce a target chemical compound and infers the chemical compound (i.e. deliverables) produced by the plant as a task to be executed. In this example, input data is observed data of the plant, control data is a control value of the plant such as valve opening [%], and the time series of the task is a time series of actual yields of the target chemical compound produced from the plant.

The image is compressed in its dimensions by the convolution layer of the first network 10. For example, the input is set to be three channels of the image, and the horizontal and vertical optical flow images. Information of this compressed image and the joint state is further compressed by the fully connected layer to acquire the latent state. Thus, the conversion indicated in Mathematical expression 1 is performed by the first network 10.

The second network 12 performs the conversion indicated in Mathematical expression 2. The second network 12 forms, for example, the LSTM with the fully connected layer whose dimension of input and output is the same as the output dimension of the first network 10. The latent state h(t) output by Mathematical expression 1 is converted into h(t+1) through the second network 12 based on the control input u(t). For example, a cell state of the LSTM may be initialized as 0.

The third network 14 performs the conversion indicated in Mathematical expression 3. The third network 14 converts h(t+1) into the task predicted value o(t+1).

The fourth network 16 performs the conversion indicated in Mathematical expression 4. The fourth network 16 converts h(t+1) into the joint state s(t+1) by the fully connected layer having the opposite structure to the fully coupled layer provided in the first network 10.

The fifth network 18 performs the conversion indicated in Mathematical expression 5. The fifth network 18 converts h(t+1) into the image of the control target 4 by the fully connected layer having the opposite structure to the fully connected layer provided in the first network 10 and the convolution layer having the opposite structure to the convolution layer provided in the first network 10 and whose output is one channel.

In parallel with the forward propagation of the third network 14, the fourth network 16, and the fifth network 18, h(t+1) that is the output of the second network 12, the cell state, and the input u(t+1) may be input to the second network 12 to acquire the next latent state h(t+2). In this way, the latent states are acquired sequentially through the second network 12.

Some or all of each apparatus (the inference apparatus 2 or training apparatus 3) in the aforementioned embodiment may be configured in hardware, or information processing of software (programs) executed by a CPU (central processing unit), GPU (graphics processing unit), or the like. In the case of the information processing of software, software that enables at least some of the functions of each apparatus in the aforementioned embodiment may be stored in a non-temporary storage medium (non-temporary computer-readable medium) such as a flexible disk, CD-ROM (compact disc-read only memory) or USB (universal serial bus) memory, and the information processing of software may be executed by loading the software into a computer. The software may also be downloaded through a communication network. Further, the software may be implemented in a circuit such as an ASIC (application specific integrated circuit) or FPGA (field programmable gate array), wherein the information processing may be executed by hardware.

A type of a storage medium to store the software is not limited. The storage medium is not limited to removable storage media such as a magnetic disk or an optical disk but may be a fixed type storage medium such as a hard disk or a memory. The storage medium may be provided inside the computer or outside the computer.

Figure 12:
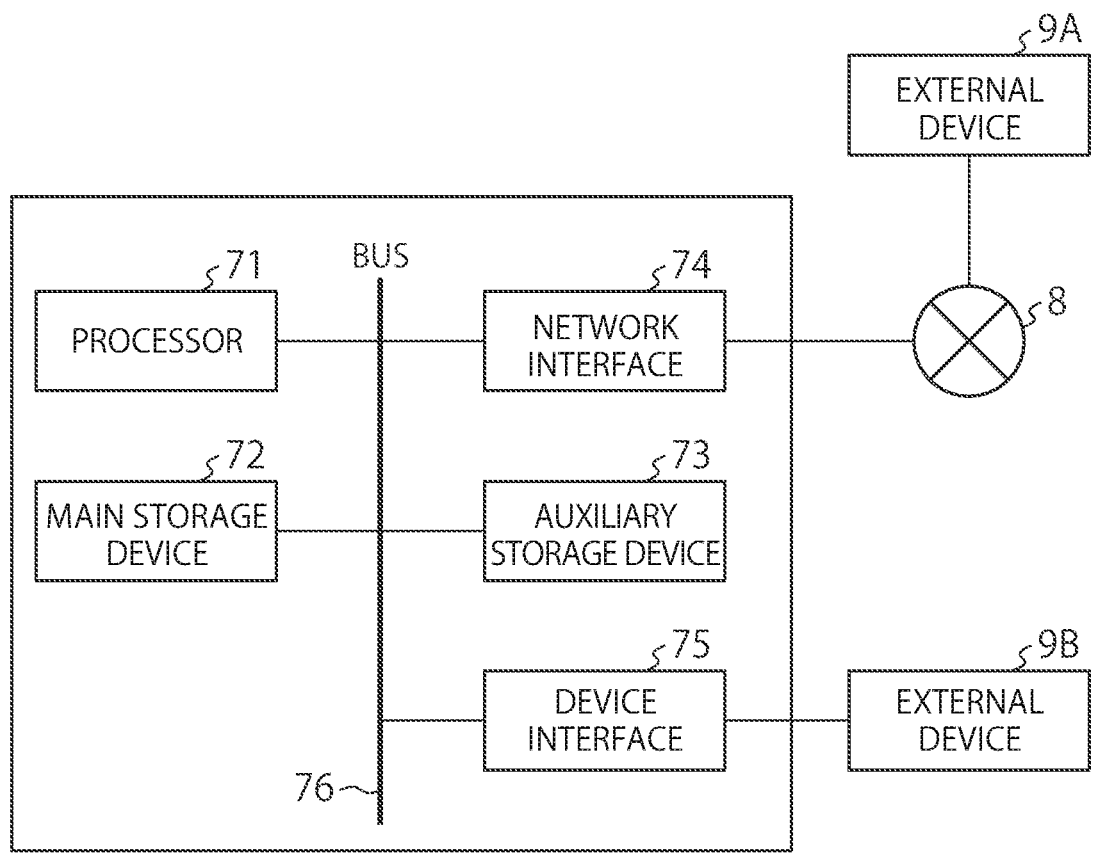
FIG. 12 is a diagram illustrating a hardware implementation example according to one embodiment.

FIG. 12 is a block diagram illustrating an example of a hardware configuration of each apparatus (the inference apparatus 2 or training apparatus 3) in the aforementioned embodiment. Each apparatus may be enabled as a computer 7 provided with a processor 71, a main storage device 72, an auxiliary storage device 73, a network interface 74, and a device interface 75, which are connected through a bus 76.

The computer 7 in FIG. 12 is provided with each component one by one but may be provided with a plurality of the same components. Although one computer 7 is illustrated in FIG. 12, the software may be installed on a plurality of computers, and each of the plurality of computers may execute the same or a different part of the software processing. In this case, it may be in a form of distributed computing where each of the computers communicates with each of the computers through the network interface 74 and the like to execute the processing. That is, each apparatus (the inference apparatus 2 or training apparatus 3) in the aforementioned embodiment may be configured as a system where one or more computers execute the instructions stored in one or more storages to enable functions. Each apparatus may be configured such that the information transmitted from a terminal is processed by one or more computers provided on a cloud and results of the processing are transmitted to the terminal.

Various arithmetic operations of each apparatus (the inference apparatus 2 or training apparatus 3) in the aforementioned embodiment may be executed in parallel processing using one or more processors or using a plurality of computers over a network. The various arithmetic operations may be allocated to a plurality of arithmetic cores in the processor and executed in parallel processing. Some or all of the processes, means, and the like of the present disclosure may be executed by at least one of the processor and the storage device provided on a cloud that can communicate with the computer 7 through a network. Thus, each apparatus in the aforementioned embodiment may be in a form of parallel computing by one or more computers.

The processor 71 may be an electronic circuit (such as a processing circuit, processing circuitry, CPU, GPU, FPGA, or ASIC) that includes a control device and an arithmetic device of a computer. The processor 71 may also be a semiconductor device or the like including a dedicated processing circuit. The processor 71 may not be limited to the electronic circuits using electronic logic elements but may be enabled by optical circuits using optical logic elements. The processor 71 may also include an arithmetic function based on quantum computing.

The processor 71 can execute arithmetic processing based on data and software (programs) input from each device, and the like of the internal configuration of the computer 7, and can output arithmetic results and control signals to each device, and the like. The processor 71 may control each component of the computer 7 by executing an OS (operating system), applications, and the like of the computer 7.

Each apparatus (the inference apparatus 2 or training apparatus 3) in the aforementioned embodiment may be enabled by one or more processors 71. The processor 71 may refer to one or more electronic circuits located on one chip or one or more electronic circuits located on two or more chips or devices. When a plurality of electronic circuits are used, each electronic circuit may communicate by wired or wireless.

The main storage device 72 is a storage device for storing instructions to be executed by the processor 71, various data, and the like, and the information stored in the main storage device 72 is read out by the processor 71. The auxiliary storage device 73 is a storage device other than the main storage device 72. These storage devices shall mean any electronic component capable of storing electronic information and may be a semiconductor memory. The semiconductor memory may be either a volatile or non-volatile memory. The storage device for storing various data in each apparatus (the inference apparatus 2 or training apparatus 3) in the aforementioned embodiment may be enabled by the main storage device 72 or auxiliary storage device 73 or may be enabled by a built-in memory built into the processor 71. For example, the storages 202, 302 in the aforementioned embodiment may be implemented in the main storage device 72 or the auxiliary storage device 73.

A plurality of processors may be connected (coupled) or a single processor may be connected to a single storage device (memory). A plurality of storage devices (memories) may be connected (coupled) to one processor. When each apparatus (the inference apparatus 2 or training apparatus 3) in the aforementioned embodiment is configured by at least one storage device (memory) and a plurality of processors connected (coupled) to this at least one storage device (memory), a configuration where at least one of the plurality of processors is connected (coupled) to the at least one storage device (memory) may be included. This configuration may also be enabled by storage devices (memories) included in a plurality of computers and a processor. Further, a configuration where a storage device (memory) is integrated with a processor (for example, a cache memory including an L1 cache and an L2 cache) may be included.

The network interface 74 is an interface for connecting to a communication network 8 by wireless or wired. The network interface 74 may be compatible with existing communication standards. With the network interface 74, information may be exchanged with an external device 9A connected through the communication network 8.

The external device 9A includes, for example, a camera, a motion capture, an output destination device, an external sensor, an input source device, or the like. An external storage device (memory), for example, a network storage or the like may be provided as the external device 9A. The external device 9A may also be a device having functions of some of the components of each apparatus (the inference apparatus 2 or training apparatus 3) in the aforementioned embodiment. The computer 7 may then receive some or all of the processing results through the communication network 8, such as a cloud service, or may transmit the results outside the computer 7.

The device interface 75 is an interface such as a USB that directly connects to the external device 9B. The external device 9B may be an external storage medium or a storage device (memory). The storages 202 and 302 in the aforementioned embodiment may be enabled by the external device 9B.

The external device 9B may be an output device. The output device may be, for example, a display device for displaying images, or a device for outputting sound or the like. For example, the external device 9B may be output destination devices and the like such as an LCD (liquid crystal display), a CRT (cathode ray tube), a PDP (plasma display panel), an organic EL (electro luminescence) panel, a speaker, a personal computer, a tablet terminal, or smartphones, but not limited thereto. The external device 9B may also be an input device. The input device is provided with a device such as a keyboard, a mouse, a touch panel, or a microphone, and provides the computer 7 with information entered through these devices.

In the present specification, the representation of "at least one of a, b and c" or "at least one of a, b, or c" includes any combination of a, b, c, a-b, a-c, b-c and a-b-c. It also covers combinations with multiple instances of any element such as a-a, a-b-b, a-a-b-b-c-c or the like. It further covers adding other elements beyond a, b and/or c, such as having a-b-c-d.

In the present specification (including the claims), the expressions such as "data as input/based on/according to/in accordance with data" (including similar expressions) are used, unless otherwise specified, it includes cases where various data themselves are used as input, or where various data processed in some way (for example, noise addition, normalization, intermediate representation of various data, and the like) are used as input. When it is stated that some result can be obtained "based on/according to/in accordance with data", this includes cases where the results are obtained based on the data alone, and may also include cases where the results are obtained by being affected by other data than the data, factors, conditions, and/or states. When it is stated that "data is output", unless otherwise specified, it also includes cases where various data themselves are used as outputs, or where various data processed in some way (for example, noise addition, normalization, intermediate representation of various data, and the like) are used as output.

In the present specification (including the claims), the terms such as "connected" and "coupled" are intended as non-exclusive terms including any cases of directly connected/coupled, indirectly connected/coupled, electrically connected/coupled, communicatively connected/coupled, operatively connected/coupled, physically connected/coupled, and the like. The terms should be interpreted accordingly, depending on the context in which they are used, but any form of connection/coupling that is not intentionally or naturally excluded shall be included in the terms and interpreted in a non-exclusive manner.

In the present specification (including the claims), the expression such as "A configured to B" may include that a physical structure of element A is configured to perform operation B, as well as a permanent or temporary setting/configuration of element A are configured/set to actually perform operation B. For example, when element A is a general-purpose processor, the processor may have a hardware configuration capable of performing operation B and may be configured to actually perform operation B by setting a permanent or temporary program (instruction). When element A is a dedicated processor, a dedicated arithmetic circuit, or the like, a circuit structure of the processor may be implemented to actually perform operation B, irrespective of whether or not control instructions and data are actually attached thereto.

In the present specification (including the claims), the terms referring to inclusion or possession (for example, "comprising/including", "having", and so on) are intended to be open-ended terms, including cases where they include or possess something other than the subject matter indicated by the object of the term. If the object of these terms implying inclusion or possession is an expression that does not specify a quantity or suggests a singular number (an expression with a or an article), the expression should be construed as not being limited to a specific number.

In the present specification (including the claims), when the expression such as "one or more" or "at least one" is used in some places, and the expression that does not specify a quantity or suggests a singular number (the expression with a or an article) is used elsewhere, it is not intended that the latter expression means "one". In general, the expression that does not specify a quantity or suggests a singular number (the expression with a or an as an article) should be construed as not necessarily limited to a specific number.

In the present specification, when it is stated that a particular configuration of an example results in a particular effect (advantage/result), it should be understood that, unless there is some other reason, the effect is also obtained for one or more other examples having the configuration. However, it should be understood that the presence or absence of such an effect generally depends on various factors, conditions, and/or states, etc., and that such an effect is not always achieved by the configuration. The effect is only achieved by the configuration in the examples when various factors, conditions, and/or states are met, but not necessarily in the inventions of claims reciting the configuration or a similar configuration.

In the present specification (including the claims), the term such as "maximize" includes finding a global maximum value, finding an approximate value of the global maximum value, finding the local maximum value, and finding an approximate value of a local maximum value, and should be interpreted accordingly depending on the context in which the term is used. It also includes finding the approximated value of these maximum values probabilistically or heuristically. Similarly, the term such as "minimize" includes finding a global minimum value, finding an approximated value of the global minimum value, finding a local minimum value, and finding an approximated value of the local minimum value, and should be interpreted accordingly depending on the context in which the term is used. It also includes finding the approximated value of these minimum values probabilistically or heuristically. Similarly, the term such as "optimize" includes finding a global optimum value, finding an approximated value of the global optimum value, finding a local optimum value, and finding an approximated value of the local optimum value, and should be interpreted accordingly depending on the context in which the term is used. It also includes finding the approximated value of these optimal values probabilistically or heuristically.

While certain embodiments of the present disclosure have been described in detail above, the present disclosure is not limited to the individual embodiments described above. Various additions, changes, substitutions, partial deletions, etc. are possible to the extent that they do not deviate from the conceptual idea and purpose of the invention derived from the contents of the claims and their equivalents. For example, in all of the aforementioned embodiments, the numerical values used in the description are shown as an example and are not limited thereto. The order of each operation in the embodiment is shown as an example and is not limited thereto.

The invention claimed is:

1. An inference method, comprising:
acquiring data on a state of a control target;
inferring, based on at least (i) the data on the state of the control target and (ii) control data for controlling the control target, a time series of a task to be executed by the control target to be controlled based on the control data;
calculating at least a loss between the time series of the task and data indicating a target state; and
updating at least a part of the control data based on at least the loss, the updated control data being utilized to control the control target, wherein
the control target is an industrial plant to produce a predetermined chemical compound,
the data on the state of the control target is observable data in the industrial plant,
the control data is related to a valve opening to control the industrial plant,
the time series of the task is related to an actual yield of the predetermined chemical compound produced in the industrial plant, and
the data indicating the target state is related to a production amount of the predetermined chemical compound.

2. An inference apparatus, comprising:
one or more memories; and
one or more processors configured to:
acquire data on a state of a control target;
infer, based on at least (i) the data on the state of the control target and (ii) control data for controlling the control target, a time series of a task to be executed by the control target to be controlled based on the control data;
calculate at least a loss between the time series of the task and data indicating a target state; and
update at least a part of the control data based on at least the loss, the updated control data being utilized to control the control target, wherein
the control target is an industrial plant to produce a predetermined chemical compound,
the data on the state of the control target is observable data in the industrial plant,
the control data is related to a valve opening to control the industrial plant,
the time series of the task is related to an actual yield of the predetermined chemical compound produced in the industrial plant, and
the data indicating the target state is related to a production amount of the predetermined chemical compound.

3. An inference apparatus, comprising:
one or more memories; and one or more processors configured to:

acquire data on a state of a control target;

infer, based on at least (i) the data on the state of the control target and (ii) control data for controlling the control target, a time series of a task to be executed by the control target to be controlled based on the control data;

calculate at least a loss between the time series of the task and data indicating a target state; and update at least a part of the control data based on at least the loss, the updated control data being utilized to control the control target, wherein the control target is an industrial plant having one or more valves adjusting at least one of a temperature, a flow, a pressure, a level, or a density to produce a predetermined chemical compound, the data on the state of the control target is observed data of the industrial plant, the control data includes data on a valve opening of a valve in the industrial plant, the time series of the task is related to an actual yield of the predetermined chemical compound produced in the industrial plant, and the data indicating the target state is related to a production amount of the predetermined chemical compound.

4. A non-transitory computer readable medium storing a program for executing a method, the method comprising:

acquiring observable data on a state of an industrial plant producing a predetermined chemical compound;

inferring, based on at least (i) the observable data on the state of the industrial plant and (ii) control data related to a valve opening for controlling the industrial plant, data related to an amount of the predetermined chemical compound produced if the industrial plant is controlled based on the control data;

calculating at least a loss between the inferred data related to the amount of the predetermined chemical compound and target data related to an amount of the predetermined chemical compound; and updating at least a part of the control data based on at least the loss, the updated control data being utilized to control the industrial plant.

5. A system comprising:

one or more memories; and one or more processors configured to:

acquire observable data on a state of an industrial plant producing a predetermined chemical compound;

infer, based on at least (i) the observable data on the state of the industrial plant and (ii) control data related to a valve opening for controlling the industrial plant, data related to an amount of the predetermined chemical compound produced if the industrial plant is controlled based on the control data;

calculate at least a loss between the inferred data related to the amount of the predetermined chemical compound and target data related to an amount of the predetermined chemical compound; and update at least a part of the control data based on at least the loss, the updated control data being utilized to control the industrial plant.

\* \* \* \* \*